Chas Escudier,
Cultivator.
No. 119,588. Patented Oct. 3, 1871.
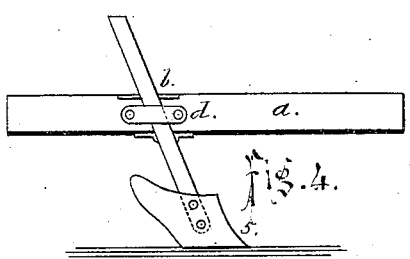
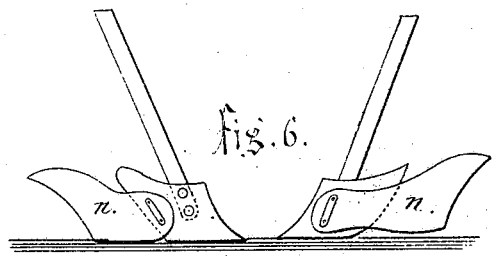
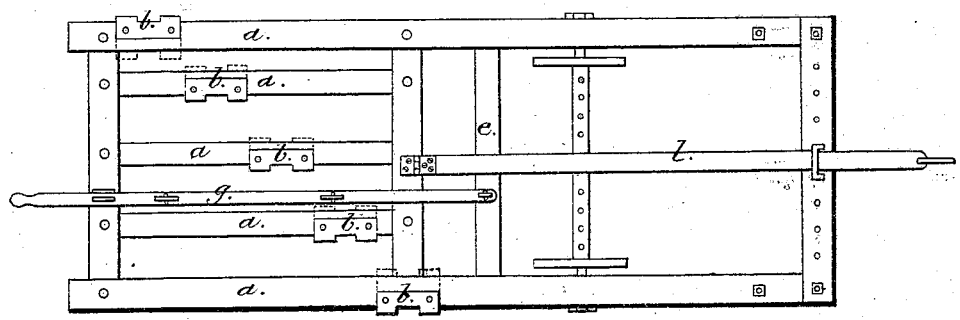
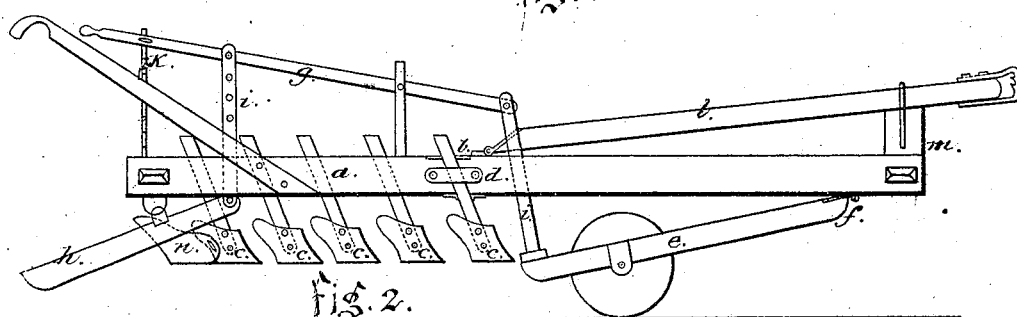
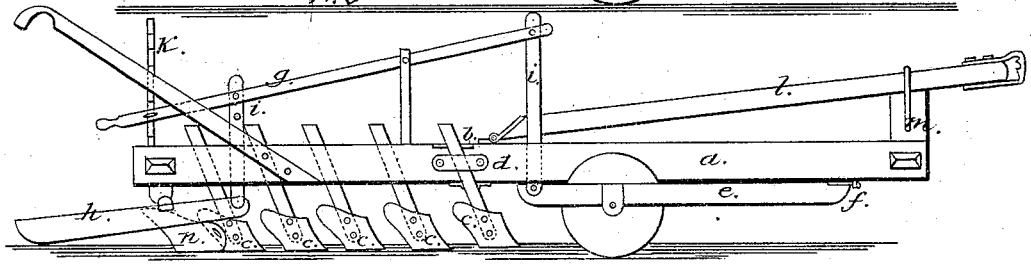

119,588

UNITED STATES PATENT OFFICE.

CHARLES ESCUDIER, OF PARISH OF IBERIA, LOUISIANA.

IMPROVEMENT IN CULTIVATORS.

Specification forming part of Letters Patent No. 119,588, dated October 3, 1871.

*To all whom it may concern:*

Be it known that I, CHARLES ESCUDIER, of the parish of Iberia, State of Louisiana, have invented a new and useful Improvement in Cultivators, which I denominate under the general term of cultivator.

It has for its object, as the term implies, the thorough cultivation and pulverization of the soil in crops generally cultivated in rows, such as corn, cotton, cane, &c., but can, by its peculiar construction, be made available for any other crop requiring a thorough pulverization of the soil in the manner herein described.

Figure 1 is the frame and fastenings of the several cultivator-plows. Fig. 2 is the whole instrument, represented while in the act of turning; consequently the plows raised clear of the ground by the double frame and shoe. Fig. 3 is the representation of the implement while at work; Fig. 4, a detached part of the frame, showing the mode of fastening the shanks of the cultivator-plows; Fig. 5, the proper shape of the plows; Fig. 6, the independent plowshare with the mode of fastening the same.

The frame, Fig. 1, is made of several longitudinal bars, $a$, carefully bolted and independent of each other, so that any or all of them can be, at the option of the operator, removed or replaced to suit the exigencies of the case. Each of these bars has a plow, $c$, fastened to it by the notched plates $b$—one above, one below—through which passes the shank, and the whole is secured by the iron plate and bolts $d$ in such a manner that any possible straining of the same is hereby avoided, affording the facility of using an independent number of plows, the ordinary number being five, in order to regulate the implement according to more or less space between rows of the plant to be cultivated. In order to secure the greater or less depth of cultivation a double frame, $e$, is adjusted and fastened at its forward end under the main frame, with an iron hook, $f$, made fast to it and passing through an eyebolt fastened on the main frame. The after end rests upon two small wheels, which are raised or lowered at will by the action of the lever $g$, thus regulating the desired depth of cultivation, and at the same time guiding and bearing the weight of the implement on ground not yet cultivated, and, by the rotary motion, causing the draft to be as light as the case requires. The forward end being thus raised or depressed at will, in order to obtain at the rear end a similar and uniform result a running shoe, $h$, made of wood, is loosely fastened near its center to the rear cross-bar, and connected at its extremity to the lever $g$ by the iron rod $i$, so that at the same time and precisely in the same proportion the rear and forward ends of the implement are raised or lowered by the single motion of the same lever. The lever $g$ is made of iron, and has eyebolt holes to receive the uprights of the shoe and double frame, the fulcrum being at or near the center of the longitudinal bars and there fastened, so as not to interfere with the widening or contracting of the implement. In order to retain the lever $g$ in its proper position a notched upright bar of iron, $k$, is bolted on the after cross-bar, onto which notches the lever is secured, either while at work or when desirable to clear the cultivator-plows from the ground, as, in the act of turning, to cultivate the opposite side of the row, or in taking the implement to and from the field of work. To secure the draft of the team at any desired angle the draft-beam $l$ is made longer than the main frame, and is fastened to it by movable clamps at each end to obtain the point of traction at the most desirable place, as it is obvious that said point would be too low if fastened direct on the level of main frame. The cross-bar $m$ is also movable to raise or depress said point of traction according to the more or less height of the team, in such a manner that the implement should work on a level, which position is necessary to obtain the full benefit from it. In the back part of the rear plow is adjusted an independent plowshare, $n$, of a peculiar form, secured by two bolts passing through a slit cut for the purpose, allowing the same to be raised or lowered at will, the object being, while cultivating, to cleanse the furrow of any loose earth thrown in by the action of the plows. It also answers, by being set higher or lower, to steady the sidewise motion of the cultivator. As it is very often necessary in crops cultivated in rows, such as cane, cotton, and corn, to bare the roots of the plant of the compact soil and replace it by new and thoroughly-pulverized, and also in cane to destroy the old stubble roots, the implement is provided with a common colter—which, being public property, I do not deem necessary to further explain—said colter being fastened in the usual manner in front of the first plow—which, for the purpose, is made to throw the mold to the left instead of to the right—the object is thus attained, the balance remaining the same.

It will be seen that by the simple reversion of position of the bars $a$ the diagonal of the cultivator is thrown from left to right, and vice versa; also, that by reversing the position of the notched plates any possible and desirable width of cultivation is attainable with the cultivator.

I claim—

The arrangement, in a cultivator, of the main frame $a$, bearing-wheel and frame $e$, standard plates $d$, shoe $h$, lever $g$, rods $i$, and draft-beam $l$, all constructed to operate as described.

CHS. ESCUDIER.

Witnesses:
P. ROZIER,
IGNACE MAITRE.